US009175588B2

(12) United States Patent
Steele et al.

(10) Patent No.: US 9,175,588 B2
(45) Date of Patent: Nov. 3, 2015

(54) DIESEL PARTICULATE FILTER REGENERATION IN TRANSPORT REFRIGERATION SYSTEM

(71) Applicant: Carrier Corporation, Farmington, CT (US)

(72) Inventors: John T. Steele, Marcellus, NY (US); Benjamin E. Ferguson, Cazenovia, NY (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 14/371,050

(22) PCT Filed: Mar. 5, 2013

(86) PCT No.: PCT/US2013/029075
§ 371 (c)(1),
(2) Date: Jul. 8, 2014

(87) PCT Pub. No.: WO2013/134238
PCT Pub. Date: Sep. 12, 2013

(65) Prior Publication Data
US 2015/0007552 A1    Jan. 8, 2015

Related U.S. Application Data

(60) Provisional application No. 61/608,867, filed on Mar. 9, 2012.

(51) Int. Cl.
F01N 3/00      (2006.01)
F01N 3/023     (2006.01)
(Continued)

(52) U.S. Cl.
CPC . *F01N 3/023* (2013.01); *B60P 3/20* (2013.01); *F01N 3/08* (2013.01); *F02D 31/001* (2013.01);
(Continued)

(58) Field of Classification Search
CPC ............ F01N 3/023; F01N 3/08; B60P 3/20; F02D 31/001; F02D 41/029
USPC .......................................................... 60/274
See application file for complete search history.

(56) References Cited

U.S. PATENT DOCUMENTS 5,904,902 A * 5/1999 Matuoka et al. ............... 422/174
5,966,931 A * 10/1999 Yoshizaki et al. .............. 60/284
(Continued)

FOREIGN PATENT DOCUMENTS

EP    1455070 A2    9/2004
EP    2020487 A2    2/2009
(Continued)

OTHER PUBLICATIONS

PCT International Preliminary Report on Patentability and Written Opinion of the International Searching Authority for International Application No. PCT/US2013/029075, Sep. 18, 2014, 7 pages.
(Continued)

*Primary Examiner* — Jason Shanske
(74) *Attorney, Agent, or Firm* — Cantor Colburn LLP

(57) ABSTRACT

A method and system are provided for performing a regeneration cycle for regenerating a diesel particulate filter (56) for removing particulate matter from a flow of engine exhaust gas from a diesel engine associated with a refrigeration system (10) having a refrigeration unit (20) powered by the diesel engine (32) having a first higher RPM speed and a second lower RPM speed.

17 Claims, 4 Drawing Sheets

(51) Int. Cl.
*B60P 3/20* (2006.01)
*F02D 41/02* (2006.01)
*F02D 31/00* (2006.01)
*F01N 3/08* (2006.01)

(52) U.S. Cl.
CPC ........... *F02D 41/029* (2013.01); *F01N 2590/08* (2013.01); *F02D 2200/101* (2013.01); *F02D 2250/24* (2013.01)

(56) References Cited

U.S. PATENT DOCUMENTS

| | | | |
|---|---|---|---|
| 6,052,988 A * | 4/2000 | Ikeda | 60/284 |
| 6,770,116 B2 * | 8/2004 | Kojima | 95/14 |
| 7,356,986 B2 | 4/2008 | Aida et al. | |
| 7,469,532 B2 | 12/2008 | Williamson et al. | |
| 7,650,781 B2 | 1/2010 | Keski-Hynnila et al. | |
| 8,042,326 B2 | 10/2011 | Farell et al. | |
| 8,061,129 B2 | 11/2011 | Irlbeck et al. | |
| 2004/0172935 A1 * | 9/2004 | Otake et al. | 60/295 |
| 2005/0086932 A1 | 4/2005 | Cheong | |
| 2010/0024395 A1 * | 2/2010 | Gotou et al. | 60/277 |
| 2010/0043430 A1 | 2/2010 | Dehart | |
| 2010/0186373 A1 | 7/2010 | Pierz et al. | |
| 2010/0326055 A1 | 12/2010 | Huber et al. | |
| 2011/0000193 A1 | 1/2011 | Paterson et al. | |
| 2011/0016848 A1 | 1/2011 | Brooks | |
| 2011/0131954 A1 | 6/2011 | Parnin | |
| 2011/0232264 A1 | 9/2011 | Lucht | |

FOREIGN PATENT DOCUMENTS

| | | |
|---|---|---|
| EP | 2116698 A1 | 11/2009 |
| JP | 2005337062 A | 12/2008 |
| WO | 2011133155 A1 | 10/2011 |

OTHER PUBLICATIONS

PCT International Search Report and the Written Opinion of the International Search Authority, or the Declaration for International Application No. PCT/US2013/029075, Jun. 18, 2013, 10 pages.

* cited by examiner

DIESEL PARTICULATE FILTER REGENERATION IN TRANSPORT REFRIGERATION SYSTEM

BACKGROUND OF THE INVENTION

This disclosure relates generally to transport refrigeration systems having an on-board diesel engine. More particularly, this disclosure relates to regeneration of a diesel particle filter during operation of the transport refrigeration system.

Fruits, vegetables and other perishable items, including meat, poultry and fish, fresh or frozen, are commonly transported in the cargo box of a truck, a trailer, or in an intermodal container. Accordingly, it is customarily to provide a transport refrigeration system in operative association with the cargo box for cooling the atmosphere within the cargo box. The transport refrigeration system includes a refrigerant vapor compression system, also referred to as a transport refrigeration unit, and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes a fuel-fired engine, typically a diesel fueled engine.

In many truck/trailer transport refrigeration systems, the compressor of the transport refrigeration unit is driven by the engine shaft either through a belt/chain drive or by mechanical shaft-to-shaft coupling. Additionally, other components of the transport refrigeration unit, such as condenser fans, evaporator fans and an alternator, may be driven by the engine shaft through a belt/chain drive. More recently, all electric transport refrigeration systems have been developed for truck/trailer applications wherein the engine drives an on-board generator for generating sufficient electrical power to drive an electric motor operatively associated with the compressor of the transport refrigeration unit. With respect to intermodal containers, clip-on power units, commonly referred to as generator sets or gensets, are available for mounting to the intermodal container, typically when the container is being transported by road or rail, to provide electrical power for operating the compressor drive motor of the transport refrigeration unit associated with the container. The genset includes a diesel engine and a generator driven by the diesel engine.

Although diesel engines function well in powering transport refrigerant systems, diesel engines produce exhaust gases that contain noxious emissions including carbon monoxide, oxides of nitrogen, unburned hydrocarbons and particulate matter. Diesel exhaust treatment units have been developed to reduce the emissions of carbon monoxide, unburned hydrocarbons and particulate matter emitted to the atmosphere. One type of diesel exhaust treatment unit is an in-line exhaust treatment unit that is installed in the exhaust pipe downstream of the engine exhaust manifold and includes a diesel oxidation catalyst and a diesel particulate filter disposed in series.

For example, U.S. Patent Application Publication No. US 2007/0283681 A1 discloses an in-line diesel exhaust treatment device including a diesel oxidation catalyst (DOC) and a diesel particulate filter (DPF) disposed in series. The DOC is operative to oxidize carbon monoxide to carbon dioxide, to oxidize unburned hydrocarbons to water and carbon dioxide, and to oxide nitrogen oxide (NO) to nitrogen dioxide ($NO_2$). The DPF is operative to collect particulate matter in the exhaust gases passing therethrough. International Patent Application Publication No. WO 2008/082492 A2 discloses a method and apparatus for heating exhaust gases of a diesel engine to support regeneration of an exhaust aftertreatment device while simultaneously cooling exhaust gases before passing to the atmosphere.

Although diesel particulate filters are effective in reducing particulate emissions emitted from diesel engines into the atmosphere, diesel particulate filters must be periodically subjected to a regeneration process to burn off the collected particulate matter in order to maintain the particulate removal effectiveness.

SUMMARY OF THE INVENTION

Transport refrigeration systems are typically operated at low load for a majority of time during transport of a load of perishable cargo. A need exists for a method for regenerating a diesel particulate filter on a diesel engine associated with a transport refrigeration system during periods of operation of the transport refrigeration system in a cooling mode at part-load.

In an aspect, a method is provided for performing a regeneration cycle for regenerating a diesel particulate filter for removing particulate matter from a flow of engine exhaust gas from a diesel engine associated with a refrigeration system having a refrigeration unit powered by the diesel engine having a first higher RPM speed and a second lower RPM speed. The method includes: determining whether the diesel engine is operating at the first higher RPM speed; if the diesel engine is not operating at the first higher RPM speed, increasing a refrigeration load on the refrigeration unit until the diesel engine is operating at the first higher RPM speed; maintaining the increased refrigeration load on the refrigeration unit until the regeneration cycle is terminated; and if the diesel engine was not operating at the first higher PRM initially, decreasing the refrigeration load on the refrigeration unit. In an embodiment, the refrigeration system is a transport refrigeration system having a refrigeration unit having an evaporator heat exchanger for cooling a flow of air circulating from a refrigerated cargo box in a cooling mode and having an electric resistance heater operatively associated with the evaporator heat exchanger; and wherein increasing the load on the refrigeration unit comprises energizing the electric resistance heater operatively associated with the evaporator heat exchanger to heat the circulating air while operating the refrigeration unit in a cooling mode.

The method may further include sensing an engine exhaust gas temperature upstream of the diesel particulate filter, comparing the sensed engine exhaust gas temperature to a design regeneration temperature, and if the sensed engine exhaust gas temperature is less than the design regeneration temperature, energizing an auxiliary electric resistance heater disposed in the flow of engine exhaust gas upstream of the diesel particulate filter, the auxiliary electric resistance heater being energized with electric current generated by a device powered by the diesel engine. The device for generating electric current may be an alternator driven by the diesel engine or a generator driven by the diesel engine.

In an aspect, a transport refrigeration system includes a refrigeration unit having an evaporator heat exchanger and an electric resistance heater disposed in association with the evaporator heat exchanger, a diesel engine powering the refrigeration unit, an exhaust system for discharging engine exhaust gas from the diesel engine to the atmosphere, a diesel engine exhaust gas treatment unit including a diesel particulate filter, and a refrigeration unit controller for controlling operation of the refrigeration unit. The refrigeration unit controller is configured to perform a regeneration cycle for regenerating the diesel particulate filter during a part-load operation of the refrigeration unit in a cooling mode by selectively increasing the refrigeration load until an operating engine speed of the diesel engine is increased to a target engine speed. In an embodiment, the refrigeration unit controller is configured to perform a regeneration cycle for regenerating the diesel particulate filter during a part-load operation of the refrigeration unit in a cooling mode by selectively energizing the electric resistance heater associated with the evaporator heat exchanger in the cooling mode thereby increasing the refrigeration load until an operating engine speed of the diesel engine is increased to a target engine speed. An auxiliary electric resistance heater may be disposed in the diesel engine system upstream of the diesel engine exhaust gas treatment system, the auxiliary electric resistance heater being energized with electric current generated by a device powered by the diesel engine.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
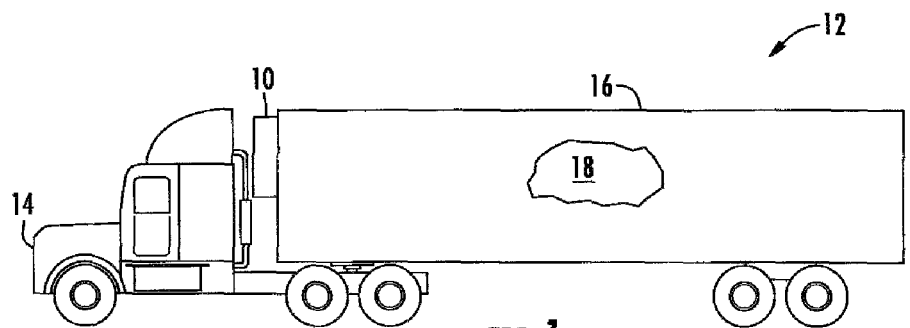
FIG. 1 is a view of a refrigerated trailer equipped with a transport refrigeration system.

The method for regenerating a diesel particulate filter disclosed herein will be described in application on a transport refrigeration system 10 associated with a trailer 12 pulled by a tractor 14 as depicted in FIG. 1. The exemplary trailer 12 includes a cargo container/box 16 defining an interior space 18 wherein perishable product is stowed for transport. The transport refrigeration system 10 is operative to climate control the atmosphere within the interior space 18 of the cargo container/box 16 of the trailer 12. It is to be understood that the method disclosed herein may be applied not only to refrigeration systems associated with trailers, but also to refrigeration systems applied to refrigerated trucks, to intermodal containers equipped with gensets, and to other refrigeration systems including a refrigerant unit having an engine driven compressor.

Figure 2:
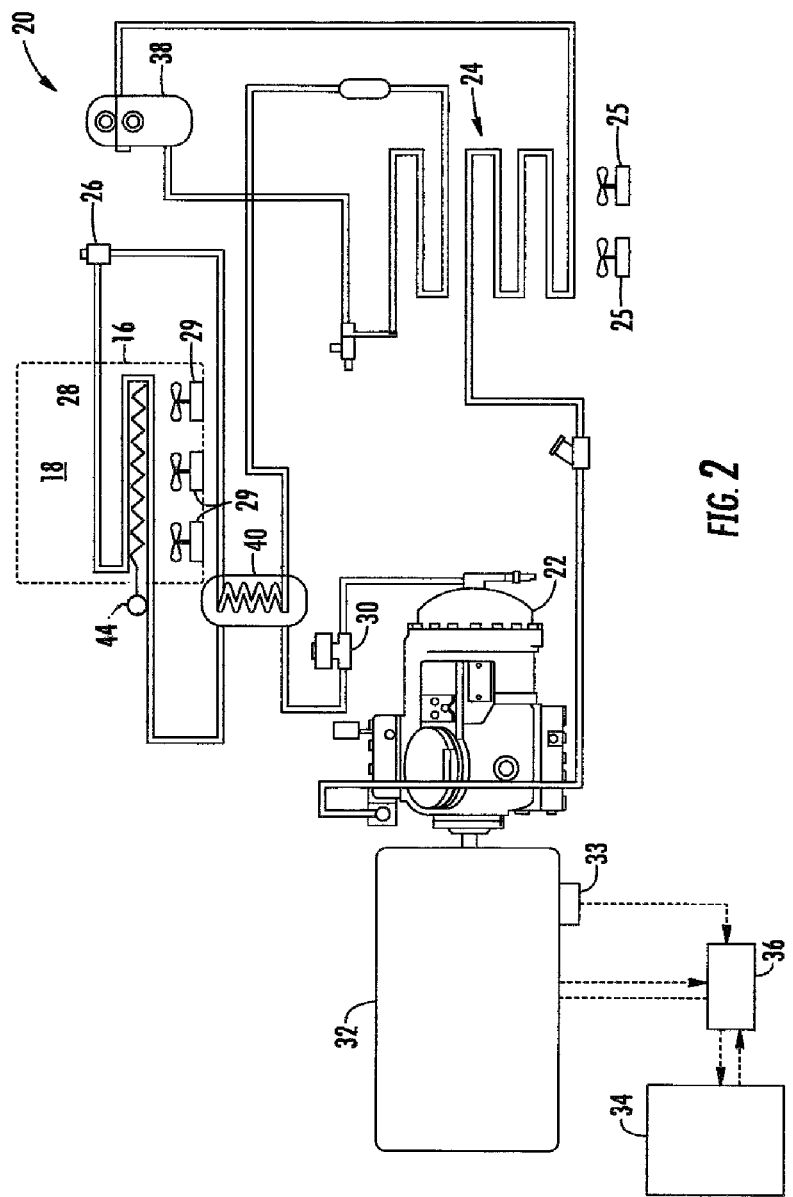
FIG. 2 is a schematic diagram of an embodiment of a transport refrigeration system wherein the compressor is directly driven by a fuel-fired engine.
Figure 3:
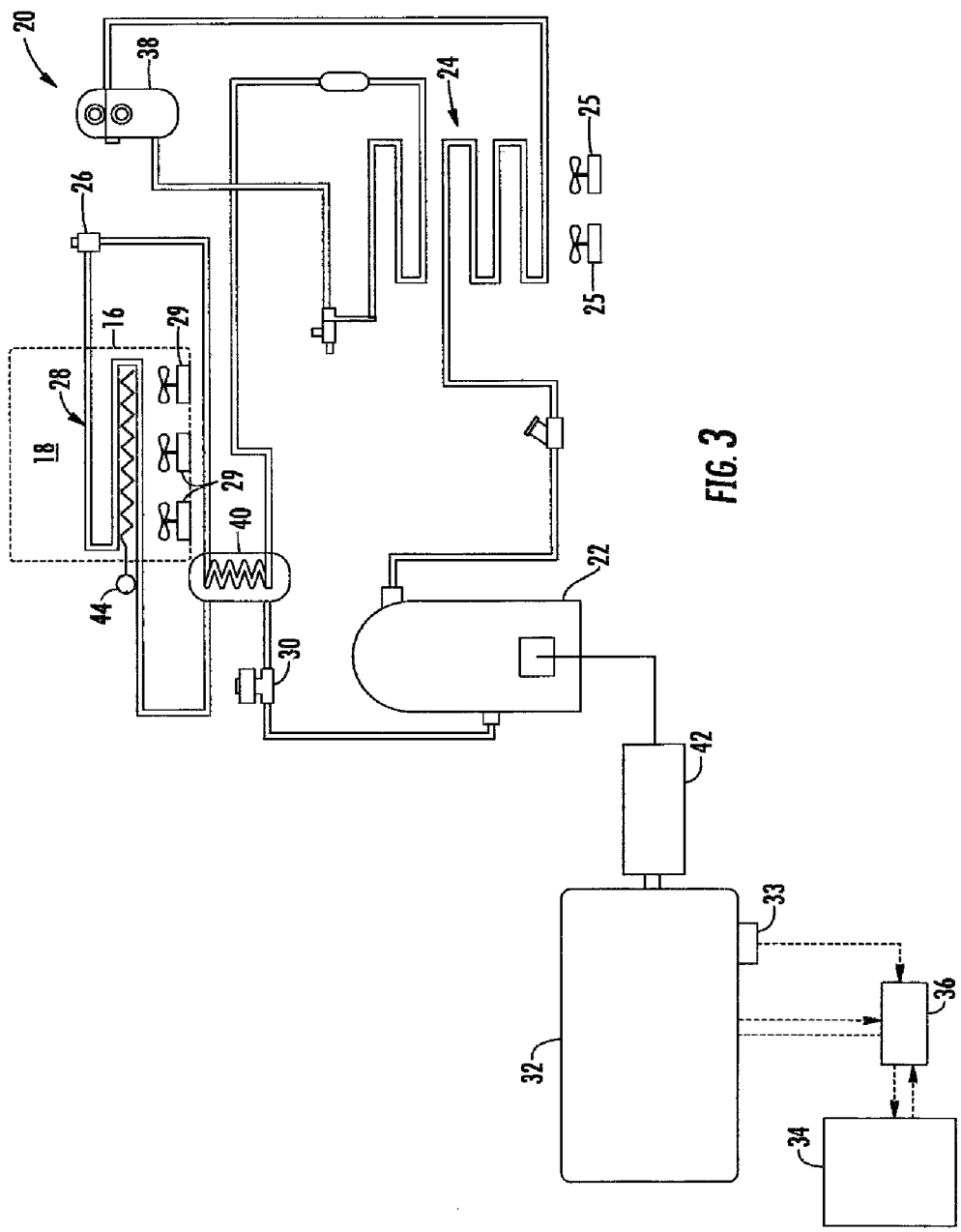
FIG. 3 is a schematic diagram of an embodiment of a transport refrigeration system wherein the compressor is driven by a motor powered by an electric generator driven by a fuel-fired engine.

Referring to FIGS. 2 and 3, there are depicted exemplary embodiments of transport refrigeration systems for cooling the atmosphere within the cargo box of a truck, trailer, container, intermodal container or similar cargo transport unit. The transport refrigeration system 10 includes a transport refrigeration unit 20 including a compressor 22, a refrigerant heat rejection heat exchanger 24 (shown as a condenser in the depicted embodiments) with its associated fan(s) 25, an expansion device 26, a refrigerant evaporator heat exchanger 28 with its associated fan(s) 29, and a suction modulation valve 30 connected in a closed loop refrigerant circuit and arranged in a conventional refrigeration cycle. The transport refrigeration system 10 further includes a diesel engine 32 equipped with an engine throttle position sensor 33, an electronic refrigeration unit controller 34 and an electronic engine controller 36. The transport refrigeration system 10 is mounted as in conventional practice to an exterior wall of the truck, trailer or container with the compressor 22 and the condenser heat exchanger 24 with its associated condenser fan(s) 25, and diesel engine 32 disposed externally of the refrigerated cargo box 16.

As in conventional practice, when the transport refrigerant unit 20 is operating in a cooling mode, low temperature, low pressure refrigerant vapor is compressed by the compressor 22 to a high pressure, high temperature refrigerant vapor and passed from the discharge outlet of the compressor 14 to circulate through the refrigerant circuit to return to the suction inlet of the compressor 22. The high temperature, high pressure refrigerant vapor passes into and through the heat exchange tube coil or tube bank of the condenser heat exchanger 24, wherein the refrigerant vapor condenses to a liquid, thence through the receiver 38, which provides storage for excess liquid refrigerant, and thence through the subcooler coil of the condenser heat exchanger 24. The subcooled liquid refrigerant then passes through a first refrigerant pass of the refrigerant-to-refrigerant heat exchanger 40, and thence traverses the expansion device 26 before passing through the evaporator heat exchanger 28. In traversing the expansion device 26, which may be an electronic expansion valve ("EXV") as depicted in FIGS. 2 and 3, or a mechanical thermostatic expansion valve ("TXV"), the liquid refrigerant is expanded to a lower temperature and lower pressure prior to passing to the evaporator heat exchanger 28.

In flowing through the heat exchange tube coil or tube bank of the evaporator heat exchanger 28, the refrigerant evaporates, and is typically superheated, as it passes in heat exchange relationship return air drawn from the cargo space 18 passing through the airside pass of the evaporator heat exchanger 28. The refrigerant vapor thence traverses a second refrigerant pass of the refrigerant-to-refrigerant heat exchanger 40 in heat exchange relationship with the liquid refrigerant passing through the first refrigerant pass thereof. Before entering the suction inlet of the compressor 22, the refrigerant vapor passes through the suction modulation valve 30 disposed downstream with respect to refrigerant flow of the refrigerant-to-refrigerant heat exchanger 40 and upstream with respect to refrigerant flow of the suction inlet of the compressor 22. The refrigeration unit controller 34 controls operation of the suction modulation valve 30 and selectively modulates the open flow area through the suction modulation valve 30 so as to regulate the flow of refrigerant passing through the suction modulation valve to the suction inlet of the compressor 22. By selectively reducing the open flow area through the suction modulation valve 30, the refrigeration unit controller 30 can selectively restrict the flow of refrigerant vapor supplied to the compressor 22, thereby reducing the capacity output of the transport refrigeration unit 20 and in turn reducing the power demand imposed on the engine 32.

Air drawn from within the cargo box 16 by the evaporator fan(s) 29 associated with the evaporator heat exchanger 28, is passed over the external heat transfer surface of the heat exchange tube coil or tube bank of the evaporator heat exchanger 28 in heat exchange relationship with refrigerant passing through the tubes of the evaporator heat exchanger 28, whereby the air is cooled. The cooled air is circulated back into the interior space 18 of the cargo box 16 to maintain the cargo box temperature within a preset relatively narrow range of at a required box temperature for the particular perishable goods stowed within the cargo box. The air drawn from the cargo box is referred to as "return air" and the air circulated back to the cargo box is referred to as "supply air". It is to be understood that the term "air" as used herein includes mixtures of air and other gases, such as for example, but not limited to nitrogen or carbon dioxide, sometimes introduced into a refrigerated cargo box for transport of perishable product such as produce.

An electric resistance heater 44 is provided in operative association with the evaporator heat exchanger 28. The electric resistance heater 44 may be selectively energized by the refrigeration unit controller 34. For example, in cold ambient temperature conditions, it may be necessary to operate the transport refrigerant unit 20 in a heating mode, rather than a cooling mode. In the heating mode, the electric resistance heater 44 is energized and the evaporator fan(s) 29 are activated to circulate air drawn from the cargo space 18 through the evaporator air side pass and back into the cargo space 18. In passing through the evaporator air side pass the circulating box air traverses the energized electric resistance heater 44 and is heated. As in conventional practice, the electric resistance heater 44 may be energized, with the evaporator fan(s) 29 off, when the transport refrigeration unit 20 is operated in a defrost mode, to melt frost from the heat exchange surface of the evaporator heat exchanger 28.

In the embodiment of the transport refrigeration system depicted in FIG. 2, the compressor 22 comprises a reciprocating compressor having a compressing mechanism (not shown) mounted on a shaft that is directly coupled to and driven by the fuel-fired engine 32. In this embodiment, the fan(s) 25 and the fan(s) 29 may also be driven by the fuel-fired engine 32 through a belt or chain drive. Additionally, the engine 32 may also power an alternator, again through a belt or chain drive, to generate electric current for powering the refrigerant unit controller 34 and other on-board electrical or electronic components of the transport refrigeration system 10.

In the embodiment of the transport refrigeration system depicted in FIG. 3, the compressor 22 comprises a semi-hermetic scroll compressor having an internal electric drive motor and a compression mechanism having an orbital scroll mounted on a drive shaft driven by the internal electric drive motor that are all sealed within a common housing of the compressor 22. The fueled-fired engine 32 drives an electric generator 42 that generates electrical power for driving the compressor motor which in turn drives the compression mechanism of the compressor 22. The drive shaft of the fueled-fired engine drives the shaft of the generator 42. In this embodiment, the fan(s) 25 and the fan(s) 29 may be driven by electric motors that are supplied with electric current produced by the generator 42. In an electrically powered embodiment of the transport refrigeration system 10, the generator 42 comprises a single on-board engine driven synchronous generator configured to selectively produce at least one AC voltage at one or more frequencies.

In an embodiment, the fueled-fired engine 32 comprises a diesel fueled piston engine, such as for example a diesel engine of the type manufactured by Kubota Corporation. However, it is to be understood that virtually any engine may be used that meets the space requirements and is capable of powering the compressor 22 or the generator 42. By way of example, the engine 32 may comprise a diesel fueled piston engine, a gasoline fueled piston engine, a natural gas or propane fuel piston engine, as well as other piston or non-piston engines that are fuel-fired.

As noted previously, the transport refrigeration system 10 also includes an electronic refrigeration unit controller 34 that is configured to operate the transport refrigeration unit 20 to maintain a predetermined thermal environment within the interior space 18 defined within the cargo box 16 wherein the product is stored during transport. The refrigerant unit controller 34 maintains the predetermined thermal environment by selectively activating and deactivating the various components of the refrigerant vapor compression system, including the compressor 22, the fan(s) 25 associated with the condenser heat exchanger 24, the fan(s) 29 associated with the evaporator heat exchanger 28, and various valves in the refrigerant circuit, including but not limited to the suction modulation valve 30, to selectively vary the refrigeration load capacity of the transport refrigeration unit 20. The refrigeration unit controller 34 is also in communication with the electronic engine controller 36. For example, the refrigeration unit controller 34 may be in closed loop communication with the electronic engine controller 36 by way of a controller area network (CAN) system.

In one embodiment, the refrigeration unit controller 34 includes a microprocessor and an associated memory. The memory of the controller 34 may be programmed to contain preselected operator or owner desired values for various operating parameters within the system. The programming of the controller is within the ordinary skill in the art. The controller 34 may include a microprocessor board that includes the microprocessor, an associated memory, and an input/output board that contains an analog-to-digital converter which receives temperature inputs and pressure inputs from a plurality of sensors located at various points throughout the refrigerant circuit and the refrigerated cargo box, current inputs, voltage inputs, and humidity levels. The input/output board may also include drive circuits or field effect transistors and relays which receive signals or current from the refrigeration unit controller 34 and in turn control various external or peripheral devices associated with the transport refrigeration system. The particular type and design of the controller 34 is within the discretion of one of ordinary skill in the art to select and is not limiting of the invention.

Figure 4:
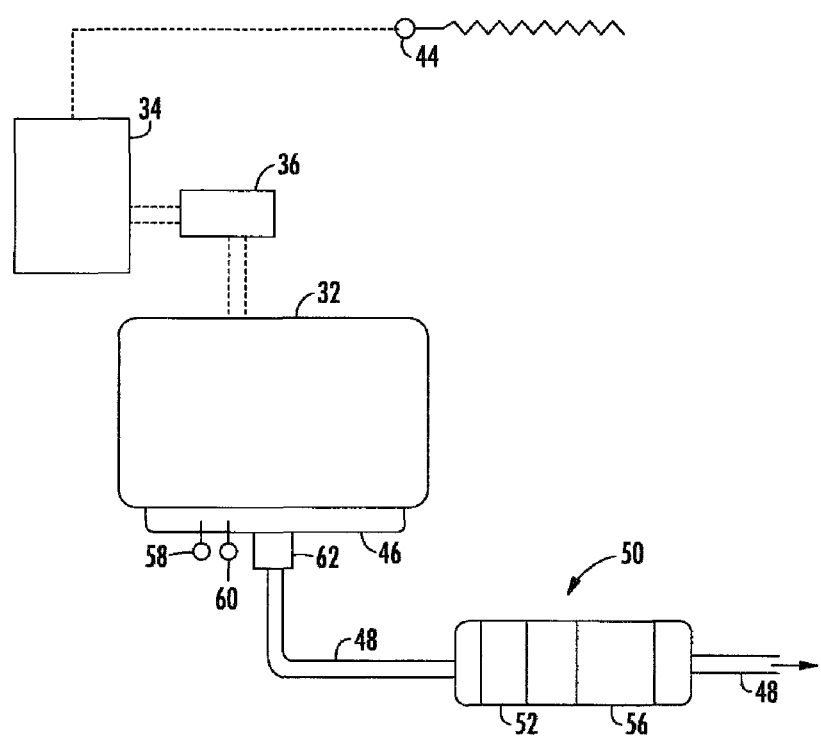
FIG. 4 is a schematic diagram of a diesel exhaust treatment unit installed in-line in the exhaust system of the transport refrigeration system.

Referring now to FIG. 4, the exhaust system of the diesel engine 32 includes an engine exhaust manifold 46, an exhaust pipe 48, and an engine exhaust treatment unit 50 disposed in-line in the exhaust pipe 48. The engine exhaust treatment unit 50 includes at least a diesel particulate filter (DPF) 56 for collecting particulate matter entrained in the engine exhaust gases passing through the exhaust pipe 48 before the engine exhaust gases are vented to the atmosphere. Additionally, as depicted in FIG. 4, the engine exhaust treatment unit 50 may also include a diesel oxidation catalyst (DOC) 52 for oxidizing unburned hydrocarbons and carbon monoxide. The diesel oxidation catalyst 52 is disposed upstream of the diesel particulate filter 56. A pressure sensor 58 is provided for sensing the engine exhaust gases temperature, EEGT, and a temperature sensor 60 is provided for sensing the engine exhaust gases pressure, EEGP. An auxiliary electric resistance heater 62 may be provided in association with the engine exhaust system. In the embodiment depicted in FIG. 4, the auxiliary electric resistance heater 62 is disposed at the upstream end of the engine exhaust gas system at the outlet of the engine exhaust manifold 46.

Typically, the transport refrigeration system 10 is operating a majority of time in a box temperature maintenance mode as opposed to operating in a box temperature pulldown mode. In a pulldown mode, the transport refrigeration unit 20 generally operates at a relatively higher load, at or near maximum refrigerant capacity, and imposes a maximum load on the diesel engine 32. However, in a temperature maintenance mode, the transport refrigeration unit 20 operates at a relatively lower load, significantly below maximum refrigerant capacity, and imposes a much lower load on the diesel engine. Thus, conventional diesel engines used as on-board engines 32 in transport refrigeration system 10 for powering transport refrigeration unit 20 are designed for operation at both a high engine RPM (revolutions per minute), for example at 1850 RPM, and a low engine RPM, for example at 1350 RPM. When the refrigeration unit 20 is operating in the pulldown mode, the diesel engine 32 generally operates at the higher RPM speed. Conversely, when the refrigeration unit 20 is operating in the temperature maintenance mode, the diesel engine 32 generally operates at the lower RPM speed.

Over time in operation of the refrigeration unit 20 at part-load operation, typically at the lower RPM speed, the diesel particulate filter 56 becomes more and more clogged as the collected particulate matter accumulates on the filter surfaces of the diesel particulate filter 56. Thus, it is necessary to periodically regenerate the diesel particulate filter 56 by burning off the accumulated particulate matter. For regeneration of conventional diesel particulate filters to be effective, the engine exhaust gases passing through the diesel particulate filter 56 must be at a temperature in excess of 600 degrees Celsius (1112 degrees Fahrenheit). Generally, when the diesel engine 32 is operating at its higher engine RPM speed, the engine exhaust gases are sufficiently hot for effective regeneration of the diesel particulate filter 56. However, when the diesel engine 32 is operating at its lower engine RPM speed, the engine exhaust gases are not hot enough to support effective regeneration of the particulate filter 56.

Figure 5:
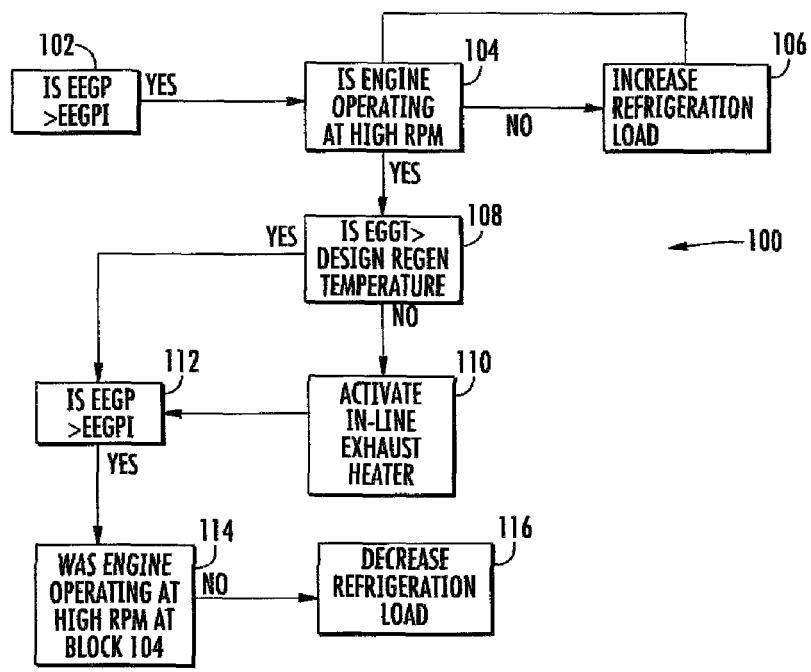
FIG. 5 shows a block diagram illustration of an embodiment of the method as disclosed herein for regenerating the diesel particulate filter during a period of low load operation of the transport refrigeration system.

Accordingly, the refrigeration unit controller 34 is configured to perform a regeneration cycle for regenerating the diesel particulate filter 56 during a part-load operation of the refrigeration unit 20 in a cooling mode by selectively increasing the refrigeration load until an operating engine speed of the diesel engine 32 is increased to a target engine speed. Further, a method is provided for performing a regeneration cycle for regenerating the diesel particulate filter 56 of the engine exhaust treatment unit 50. Referring now to FIG. 5, the method 100 includes, at block 104, determining whether the diesel engine 32 is operating at the first higher RPM speed. If the diesel engine 32 is not operating at the higher RPM speed, at block 106, the refrigeration unit controller 34 increases the refrigeration load on the refrigeration unit 20 until the diesel engine 32 is operating at the first higher RPM speed and maintains the increased refrigeration load on the refrigeration unit 20 until the regeneration cycle is terminated. Upon termination of the regeneration cycle, if the refrigeration unit controller 34, at block 114, confirms that the diesel engine 32 was not operating at the higher RPM speed initially, that is upon entering into the regeneration cycle, the refrigeration unit 20, at block 116, decreases the refrigeration load on the refrigeration unit 20. When the refrigeration unit 20 returns to operation in the temperature maintenance mode, the diesel engine 32 resumes operation at the lower RPM speed.

As noted previously, the refrigeration unit 20 of a refrigeration system 10 an evaporator heat exchanger 28 for cooling the flow of box air circulating from the interior space 18 of the refrigerated cargo box 16 when the refrigeration unit 20 is operating in a cooling mode. In an embodiment, to increase load on the refrigerant unit 20, the refrigeration unit controller 34 selectively energizes the electric resistance heater 44 operatively associated with the evaporator heat exchanger 28. When energized, the electric resistance heater 44 heats the circulating box air, even though the refrigeration unit 20 is operating in a cooling mode. Thus, to maintain the temperature within the interior space 18 of the cargo box 16 within the permitted range of the set point box temperature, the refrigeration unit 20 must increase its refrigeration capacity output. As a result of the increased refrigeration load, the electronic engine control unit 36 will up the speed of the diesel engine 32 to the higher RPM speed.

The method may further include sensing an engine exhaust gas temperature (EEGT) upstream of the diesel particulate filter 52 and comparing the sensed engine exhaust gas temperature (EEGT) to a design regeneration temperature. In the embodiment depicted in FIG. 4, the temperature sensor 60 for sensing the engine exhaust gas temperature (EEGT) is provided at the engine exhaust manifold 46. However, it is to be understood that the temperature sensor 60 may be located in association with the exhaust gas pipe 48. If the sensed engine exhaust gas temperature is less than the design regeneration temperature, the refrigeration unit controller 34 energizes the auxiliary electric resistance heater 44 disposed in the flow of engine exhaust gas upstream of the diesel particulate filter 56. The auxiliary electric resistance heater 44 is energized with electric current generated by a device powered by the diesel engine 32. The device for generating electric current may be an alternator (not shown) driven by the diesel engine or the generator 42 driven by the diesel engine.

In an embodiment of the method depicted in FIG. 4, the regeneration cycle may be initiated on demand. For example, at block 102, the refrigerant unit controller 34 compares the sensed engine exhaust gas pressure (EEGP) sensed by the pressure sensor 58 to a preset upper engine exhaust gas pressure (EEGP1) indicative of an overly clogged diesel particulate filter 56, and move on to block 104 if the sensed engine exhaust gas pressure (EEGP) is greater than the preset upper engine exhaust gas pressure (EEGP1). In an embodiment, the regeneration cycle may be terminated after lapse of a preset period of time. In the embodiment depicted in FIG. 4, the refrigeration unit controller 34, at block 112, compares the sensed engine exhaust gas pressure (EEGP) sensed by the pressure sensor 58 to a preset lower engine exhaust gas pressure (EEGP2) indicative of a regenerated unclogged diesel particulate filter 56, and move on to block 114 if the sensed engine exhaust gas pressure (EEGP) is greater than the preset lower engine exhaust gas pressure (EEGP2).

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A method for performing a regeneration cycle for regenerating a diesel particulate filter used for removing particulate matter from a flow of engine exhaust gas from a diesel engine associated with a refrigeration system having a refrigeration unit powered by the diesel engine having a first higher RPM speed and a second lower RPM speed, the method comprising:

determining whether the diesel engine is operating at the first higher RPM speed;

if the diesel engine is not operating at the high RPM speed, increasing a refrigeration load on the refrigeration unit until the diesel engine is operating at the first higher RPM speed, and maintaining the increased refrigeration load on the refrigeration unit until the regeneration cycle is terminated; and if the diesel engine was not operating at the higher RPM initially, following termination of the regeneration cycle, decreasing the refrigeration load on the refrigeration unit;

the method further comprising:

sensing an engine exhaust gas temperature upstream of the diesel particulate filter;

comparing the sensed engine exhaust gas temperature to a design regeneration temperature; and if the sensed engine exhaust gas temperature (EEGT) is less than the design regeneration temperature, energizing an auxiliary electric resistance heater disposed in the flow of engine exhaust gas upstream of the diesel particulate filter, the auxiliary electric resistance heater being energized with electric current generated by a device powered by the diesel engine.

2. The method as set forth in claim 1 wherein the regeneration cycle is terminated after the lapse of a predetermined time of operation of the diesel engine at the first higher RPM speed.

3. The method as set forth in claim 1 wherein the regeneration cycle is terminated based on a parameter associated with the engine exhaust gases.

4. The method as set forth in claim 3 wherein the parameter comprises an engine exhaust gas pressure.

5. The method as set forth in claim 1 further comprising:
initiating the regeneration cycle when an engine exhaust gas pressure (EEGP) sensed upstream of the diesel particulate filter exceeds an upper set point engine exhaust gas pressure (EEGP1); and terminating the regeneration cycle when the engine exhaust gas pressure (EEGP) sensed upstream of the diesel particulate filter drops below a lower set point engine exhaust gas pressure (EEGP2).

6. The method as set forth in claim 1 wherein the device for generating electric current comprises an alternator driven by the diesel engine.

7. The method as set forth in claim 1 wherein the device for generating electric current comprises a generator driven by the diesel engine.

8. A method for performing a regeneration cycle for regenerating a diesel particulate filter used for removing particulate matter from a flow of engine exhaust gas from a diesel engine associated with a refrigeration system having a refrigeration unit powered by the diesel engine having a first higher RPM speed and a second lower RPM speed, the method comprising:

determining whether the diesel engine is operating at the first higher RPM speed;

if the diesel engine is not operating at the high RPM speed, increasing a refrigeration load on the refrigeration unit until the diesel engine is operating at the first higher RPM speed, and maintaining the increased refrigeration load on the refrigeration unit until the regeneration cycle is terminated; and if the diesel engine was not operating at the higher RPM initially, following termination of the regeneration cycle, decreasing the refrigeration load on the refrigeration unit;

wherein the refrigeration system comprises a transport refrigeration system having a refrigeration unit having an evaporator heat exchanger for cooling a flow of air circulating from a refrigerated cargo box in a cooling mode and having an electric resistance heater operatively associated with the evaporator heat exchanger; and wherein increasing the load on the refrigeration unit comprises energizing the electric resistance heater operatively associated with the evaporator heat exchanger to heat the circulating air while operating the refrigeration unit in a cooling mode.

9. The method as set forth in claim 8 where the electric resistance heater is energized with electric current generated by a device powered by the diesel engine.

10. The method as set forth in claim 9 wherein the device for generating electric current comprises an alternator driven by the diesel engine.

11. The method as set forth in claim 9 wherein the device for generating electric current comprises a generator driven by the diesel engine.

12. The method as set forth in claim 8 wherein the regeneration cycle is terminated after the lapse of a predetermined time of operation of the diesel engine at the first higher RPM speed.

13. The method as set forth in claim 8 further comprising:
initiating the regeneration cycle when an engine exhaust gas pressure (EEGP) sensed upstream of the diesel particulate filter exceeds an upper set point engine exhaust gas pressure (EEGP1); and terminating the regeneration cycle when the engine exhaust gas pressure (EEGP) sensed upstream of the diesel particulate filter drops below a lower set point engine exhaust gas pressure (EEGP2).

14. The method as recited in claim 8 further comprising:
sensing an engine exhaust gas temperature upstream of the diesel particulate filter;

comparing the sensed engine exhaust gas temperature to a design regeneration temperature; and if the sensed engine exhaust gas temperature (EEGT) is less than the design regeneration temperature, energizing an auxiliary electric resistance heater disposed in the flow of engine exhaust gas upstream of the diesel particulate filter, the auxiliary electric resistance heater being energized with electric current generated by a device powered by the diesel engine.

15. A transport refrigeration system comprising:

a refrigeration unit having an evaporator heat exchanger and an electric resistance heater disposed in association with the evaporator heat exchanger;

a diesel engine powering the refrigeration unit, the diesel engine having an exhaust system for discharging engine exhaust gas from the diesel engine to the atmosphere;

a diesel engine exhaust gas treatment unit disposed in the diesel engine exhaust system, the diesel engine exhaust gas treatment unit including a diesel particulate filter; and a refrigeration unit controller for controlling operation of the refrigeration unit, the refrigeration unit controller configured to perform a regeneration cycle for regenerating the diesel particulate filter during a part-load operation of the refrigeration unit in a cooling mode by selectively increasing the refrigeration load until an operating engine speed of the diesel engine is increased to a target engine speed.

16. The transport refrigeration system as recited in claim 15 wherein the refrigeration unit controller is configured to perform a regeneration cycle for regenerating the diesel particulate filter during a part-load operation of the refrigeration unit in a cooling mode by selectively energizing the electric resistance heater associated with the evaporator heat exchanger in the cooling mode thereby increasing the refrigeration load until an operating engine speed of the diesel engine is increased to a target engine speed.

17. The transport refrigeration system as recited in claim 15 further comprising an auxiliary electric resistance heater disposed in the diesel engine system upstream of the diesel engine exhaust gas treatment system, the auxiliary electric resistance heater being energized with electric current generated by a device powered by the diesel engine.

\* \* \* \* \*